United States Patent [19]

Phillips

[11] 4,282,641

[45] * Aug. 11, 1981

[54] METHOD OF CONVERTING MOTOR CAR

[75] Inventor: Charles W. Phillips, Pompano Beach, Fla.

[73] Assignee: Grandeur Motorcar Corp., Pompano Beach, Fla.

[*] Notice: The portion of the term of this patent subsequent to Jul. 11, 1995, has been disclaimed.

[21] Appl. No.: 26,750

[22] Filed: Apr. 2, 1979

[51] Int. Cl.³ .................... B23P 15/00; B60P 3/42; B60P 3/00

[52] U.S. Cl. ..................... 29/416; 29/401.1; 296/26; 296/16; 296/99 R; 296/185; 296/197

[58] Field of Search .............. 29/401.1, 416, 411; 296/16, 21, 26, 99 R, 185, 197

[56] References Cited

U.S. PATENT DOCUMENTS

| | | | |
|---|---|---|---|
| 1,230,436 | 6/1917 | Schluer | 296/26 |
| 1,310,425 | 7/1919 | McIntyre | 296/26 |
| 1,470,811 | 10/1923 | Cook et al. | 296/26 |
| 1,621,675 | 3/1927 | Masury | 296/26 |
| 1,678,411 | 7/1928 | Westmoreland | 296/26 |
| 2,425,948 | 8/1947 | Lucien | 296/196 |
| 3,309,759 | 3/1967 | Vittone | 29/155 R |
| 3,487,532 | 1/1970 | Phillips | 29/416 |
| 4,014,585 | 3/1977 | Earnhart | 296/16 |
| 4,099,313 | 7/1978 | Phillips | 29/416 |

*Primary Examiner*—Daniel C. Crane
*Attorney, Agent, or Firm*—Oltman and Flynn

[57] ABSTRACT

A conventional four-door car with its body bolted to the frame is converted to a car with a lengthened engine compartment and a body which is correspondingly shortened immediately behind the door posts, and with the original frame intact and unchanged. Longitudinal sections of the roof and floor behind the door posts are removed to divide the car body into front and rear sections, and the steering shaft is disconnected from the steering gear. The front section of the car body is unbolted from the frame and then is displaced rearwardly along the frame to bring the severed edges of the roof together, after which the front and rear sections of the car body are welded back together at the roof and floor. An extension shaft is inserted between the steering shaft and the steering gear. A longer engine compartment hood and front fenders are attached.

5 Claims, 13 Drawing Figures

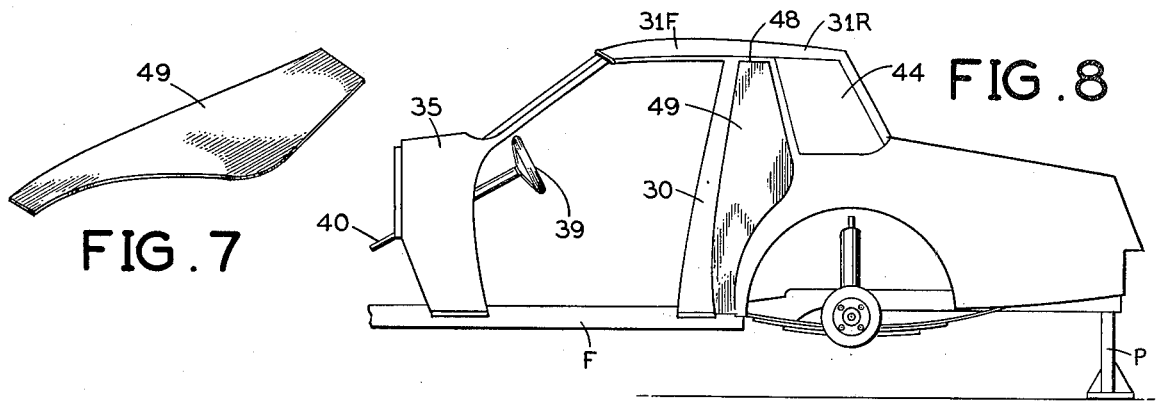
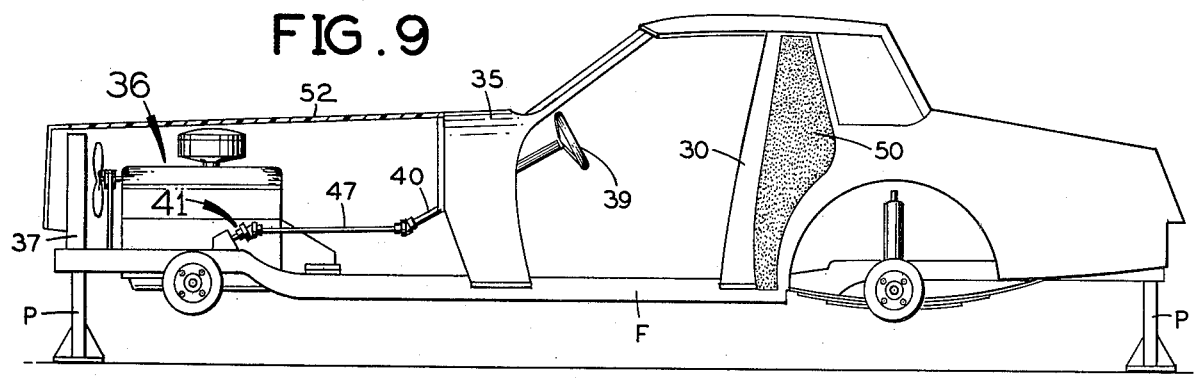
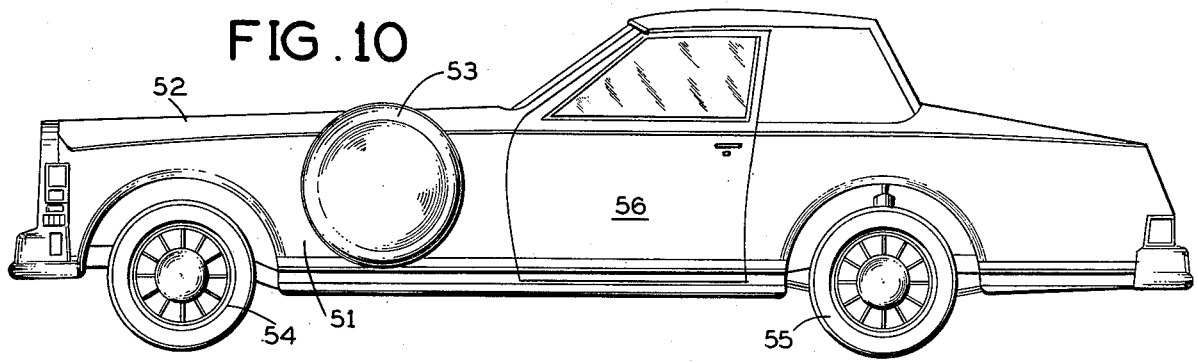
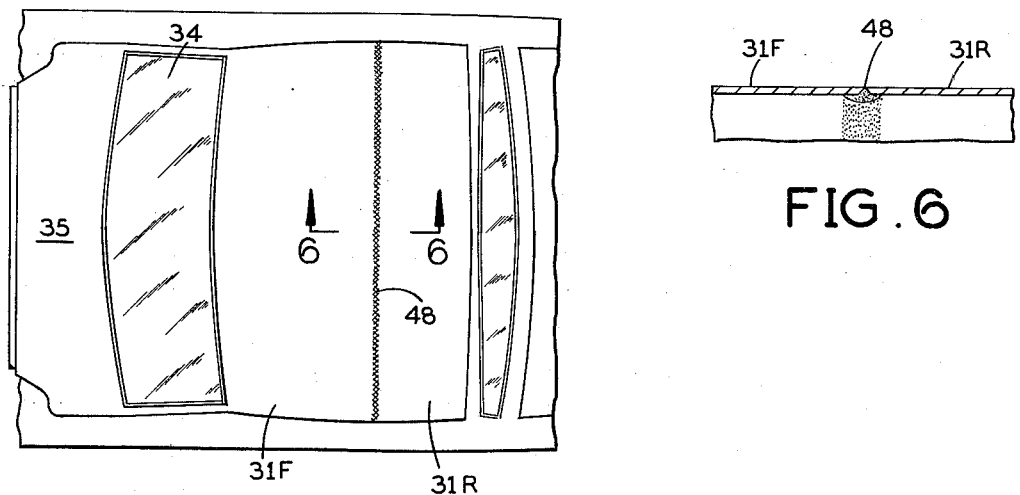

METHOD OF CONVERTING MOTOR CAR

SUMMARY OF THE INVENTION

This invention relates to a method of converting a four-door passenger car of the type which has its body bolted to the frame into a car having a lengthened engine compartment and a body which is correspondingly shortened just behind the door posts.

My U.S. Pat. No. 4,099,313 discloses and claims a method of so converting a car of the type which has a unitized body and frame, i.e., one in which the body is welded to the frame.

The present invention is based on a recognition that in the case of a car having a bolted-on body, as distinguished from a unitized body and frame, a novel and simplified method of so converting the car can be carried out which does not require any structural modification of the frame.

In accordance with this invention, longitudinal segments are removed from the roof and the floor to divide the car body into front and rear sections. The front section of the severed car body is unbolted from the frame and is displaced rearwardly along the frame to bring the front and rear sections of the roof into aligned juxtaposition where they can be welded to each other. The steering shaft is disconnected from the steering gear before the front section of the car body is moved back, so that the steering shaft and the steering wheel can be displaced rearwardly in unison with it. An extension shaft is inserted between the lower end of the steering shaft and the steering gear to couple them to each other after such rearward displacement of the steering shaft and steering wheel together with the front section of the car body.

As in the method of my aforementioned U.S. Pat. No. 4,009,313, a gap remaining in the floor after the rearward displacement of the front section of the car body is covered by a plate which is welded in place. Side plates are welded to the outside of the car body to fill in spaces immediately behind the door posts, and suitable body filler is applied over these side plates to blend in with the adjoining parts of the car body. The original front fenders and engine compartment hood are replaced by longer ones to accomodate the increased length of the engine compartment resulting from the rearward displacement of the front section of the car body.

In the case of a car having a front wheel drive, the engine preferably remains in its original position in the engine compartment.

In the case of a car having a rear wheel drive, the engine preferably is displaced rearwardly from its original position in the engine compartment, and to accommodate this the drive shaft and drive tunnel are shortened, preferably as disclosed in my U.S. Pat. No. 4,099,313, but without any structural modification of the frame.

A principal object of this invention is to provide a novel and simplified method of converting a car with a conventional bolted-on body into one having a body which is shortened behind the door posts and lengthened at the engine compartment.

Another object of this invention is to provide such a method in which the original frame of the car is kept intact and undergoes no structural modification.

Further objects and advantages of this invention will be apparent from the following detailed description of two presently preferred embodiments thereof, shown in the accompanying drawings.

DESCRIPTION OF THE DRAWINGS

FIG. 5 is a fragmentary top plan view of the car as shown in FIG. 4, with the severed sections of the roof welded to each other;

FIG. 6 is an enlarged cross-section through the weld in the roof in FIG. 5;

FIG. 7 is a perspective view of one of the side plates for attachment to the car body behind its door posts after its front section has been displaced rearwardly and the adjoining roof sections have been welded together;

FIG. 8 is an elevational view of the car behind the engine compartment after the side plates have been welded in place to fill in the car body immediately behind the door posts;

FIG. 9 is a view of the car after the body filler has been applied over each side plate and a longer hood over the engine compartment has been added;

FIG. 10 is an elevational view of the finished front wheel drive car in accordance with this first embodiment of the invention;

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

DETAILED DESCRIPTION

FIRST EMBODIMENT—FIGS. 1-10

Figure 1:
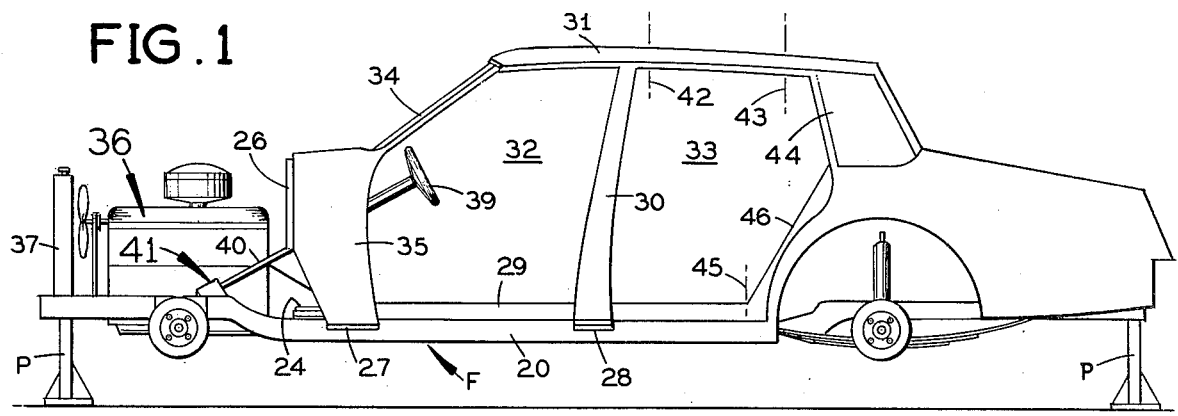
FIG. 1 is a longitudinal elevation of the frame and body of a front wheel drive four-door sedan with the wheels, doors, seats, engine compartment hood and front fenders removed.

Referring to FIG. 1, the four door passenger car shown there has a rigid frame F at the bottom with opposite, longitudinal horizontal side pieces 20 and 21 (FIG. 3) interconnected by rigid cross pieces 22, 23, 24 and 25. The rear cross piece 22 extends between the side pieces 20, 21 at the back end of the car. The cross piece 23 is located below the rear seat. The cross piece 24 is located below the firewall 26 between the engine compartment and the passenger compartment of the car. The front cross piece 25 extends in front of the front wheels. The frame F extends substantially the full length of the car body.

Figure 3:
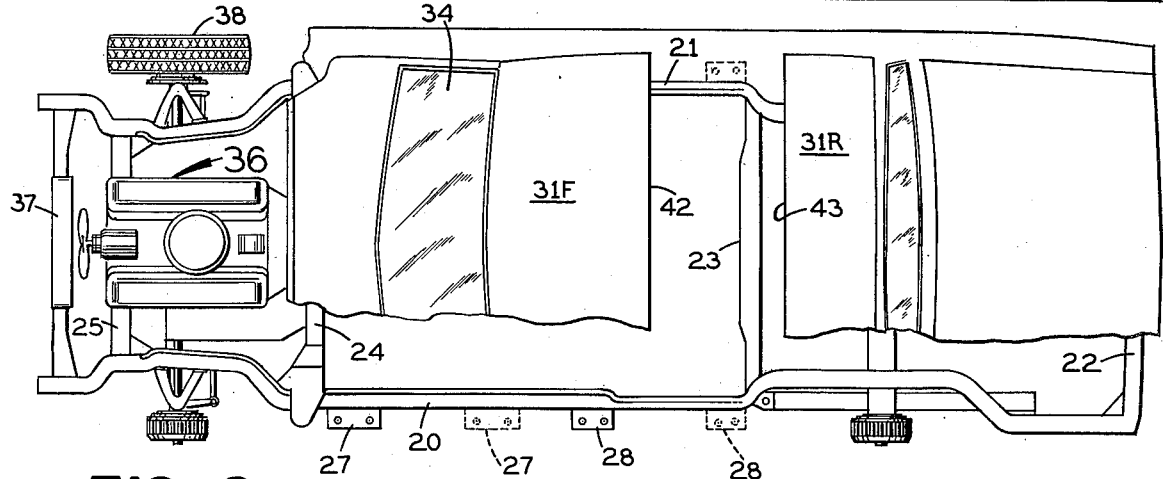
FIG. 3 is a top plan view of the car as shown in FIG. 2, showing in full lines the original positions of body mounting brackets for the front section of the car body and showing in phantom the positions to which these brackets are to be relocated.

The front part of the car body is bolted to the frame F at mounting brackets 27 and 28 on each side which are located at the positions shown in full lines in FIG. 3. The rear part of the car body is bolted to the frame at other locations (not shown). In its bolted-on body construction the original construction of the car is different from the one disclosed in my U.S. Pat. No. 4,099,313, where the car body and frame have a unitized construction in which the body and frame are welded into an integral unit.

The car body has a floor 29 and door posts 30 on its opposite sides which extend up from the floor to a roof 31. These door posts are located between the respective front door openings 32 and rear door openings 33 of the vehicle. These door openings lead into the passenger compartment of the vehicle at the front and rear seats, respectively. A windshield 34 extends down from the roof 31 in front of the passenger compartment, and below it the firewall 26 separates the passenger compartment from the engine compartment in front. A unitary segment 35 of the car body extends up from the front mounting bracket 27 on each side and horizontally in front of the bottom edge of the windshield 35 over the firewall 26.

The car engine 36 is supported by the frame F in the engine compartment behind the usual radiator 37, which is also supported by the frame. In this embodiment, the engine is coupled to the front wheels 38 of the car through a front wheel drive arrangement of known design.

The steering wheel 39 is coupled to a downwardly and forwardly inclined steering shaft 40, which has its lower end coupled to the front wheels through a steering gear 41 of known design.

In practicing the present invention the front and rear wheels are removed, and the rear doors, the rear seat, the engine compartment hood and the front fenders are removed from the car body prior to its conversion. Preferably, the front doors and the front seat or seats are removed, also.

The frame of the stripped vehicle is supported by posts P at its front and back ends, as shown in FIG. 1, and, if desired, at other locations along its length on each side.

Figure 2:
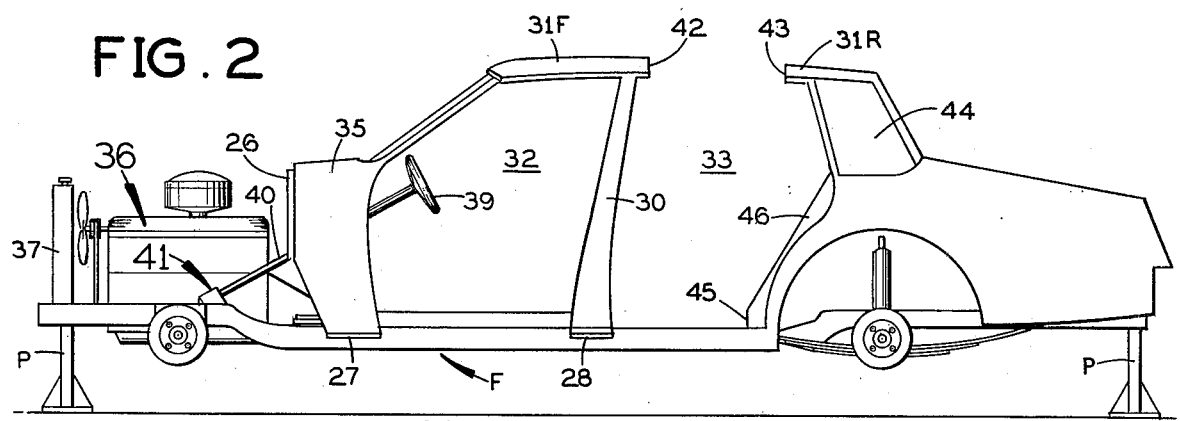
FIG. 2 is a view similar to FIG. 1 showing the car after a predetermined length of the roof behind the door posts has been removed and a section of the floor behind the door posts has been removed to separate the car body into front and rear sections.

Referring to FIG. 1, the roof 31 of the stripped vehicle is cut transversely along lines 42 and 43 to remove a 22 inch length of the roof, beginning (at line 42) a few inches behind the upper end of the door posts 30 and terminating (at line 43) several inches in front of the side panels 44 of the car body immediately behind the rear door openings 33. This leaves the roof divided into a front section 31f, overlying the front seat compartment, and a rear section 31r, extending rearward from the rear seat compartment, as shown in FIG. 2. A template (not shown) which fits snugly over the roof may be used to define the cut lines 42, 43 in the manner disclosed in my U.S. Pat. No. 4,099,313.

A corresponding segment of the floor 29 of the car body is removed by severing it along a rear cut line 45 and along a front cut line (not shown) at a location forward beyond the door posts 30. The rear cut line 45 extends transversely across the floor at the lower end of a rearwardly and upwardly inclined interior wall 46 of the car body at the back of the rear seat. The length of the severed segment of the floor preferably is more than 22 inches and it is offset forwardly with respect to the severed segment of the roof between the roof cut lines 42 and 43.

The cutting of the roof 31 and the floor 29 leaves the car body in two sections, front and rear, separated by a 22 inch gap at the roof 31 and a longer gap at the floor 29.

The lower end of the steering shaft 40 is disconnected from the steering gear 41.

Figure 4:
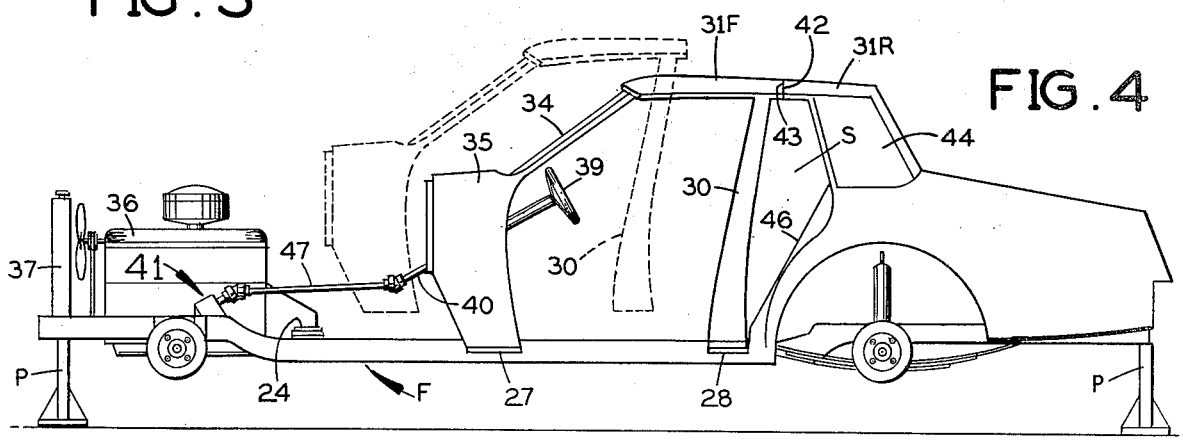
FIG. 4 is a view similar to FIG. 1 after the front section of the car body has been displaced rearward from its original position and an extension shaft has been added between the steering shaft and the steering gear to compensate for such relocation.

Following this, the front section of the car body is unbolted from the frame F and displaced rearwardly along the frame to the full line position in FIG. 4. In this rearwardly displaced position of the front section of the car body, the body mounting brackets 27 and 28 have been moved to the phantom line positions in FIG. 3, and the severed edges at 42 and 43 to the front and rear sections 31a and 31b of the roof are in aligned, abutting juxtaposition to one another. A gap remains in the floor.

The steering wheel 39 and the steering shaft 40 are displaced rearwardly in unison with the front section of the car body. The engine 36 and the steering gear 41 remain in their original positions in the engine compartment.

The rearwardly-displaced front section of the car body now is bolted to the frame and the abutting front and rear sections 31a and 31b of the roof are welded together along a transverse weld line 48 (FIGS. 5 and 6) where their cut edges 42 and 43 come together. A floor plate (not shown) is welded to the floor to cover the remaining gap between its transversely severed edges. An extension shaft 47 (FIG. 4) is inserted between the lower end of the now rearwardly-displaced steering shaft 40 and the steering gear 41. This extension shaft is coupled to the steering shaft and the steering gear so as to impart any turning movement of the steering shaft to the steering gear.

The spaces S (FIG. 4) in the sides of the car immediately behind the door posts 30 are now filled in by respective irregularly shaped sheet metal plates 49 (FIG. 7) which fit snugly in these spaces as shown in FIG. 8. The periphery of each spacer plate 49 is welded to the car body along the back edge of the corresponding door post 30, the bottom edge of the roof on opposite sides of its weld line 48, along the front of the corresponding side panel 44, and along the rear edge of what was formerly the lower half of the corresponding rear door opening. Next, these spacer plates 49 are covered by conventional body filler 50 (FIG. 9) which merges smoothly with the sides of the car throughout the vertical extent of each side from the floor to the roof behind the door posts 30. This part of the present method is the same as in my aforementioned U.S. Pat. No. 4,099,313.

It will be evident that the rearward displacement of the front section of the car body along the frame F has lengthened the engine compartment by the same amount (22 inches). New, longer front fenders 51 and a new, longer engine compartment hood 52 are attached to the car body to enclose the now-lengthened engine compartment. Obviously, the new fenders and hood must be longer than the original ones by the same dimension (22 inches) that the front section of the car body has been displaced rearwardly along the frame F. Preferably, one or both of the new front fenders incorporates a spare wheel cover 53 (FIG. 10).

FIG. 10 shows the modified car after the front and rear wheels 54 and 55 and the front doors 56 have been put back on.

The method of the present invention, as just described, enables the engine compartment to be lengthened and the car body behind the door posts to be correspondingly shortened without any structural modification of the frame and without changing the position of the engine on the frame. Also, in the embodiment just disclosed (having a front wheel drive) the drive gear acting between the engine and the front wheels remains undisturbed in its original position.

SECOND EMBODIMENT—FIGS. 11-13

The method of the present invention also may be applied to a car having a bolted-on body and a rear wheel drive. In this second embodiment, the engine preferably is displaced rearwardly along with the front section of the car body instead of remaining in its original position in the engine compartment.

Figure 11:
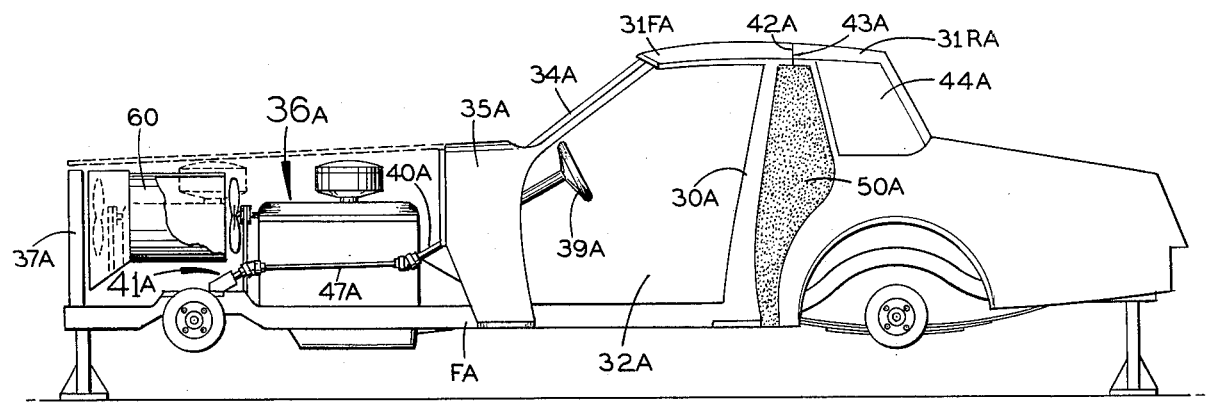
FIG. 11 is a view similar to FIG. 9 and showing a rear wheel drive car which has been modified in accordance with the method of the present invention.
Figure 12:
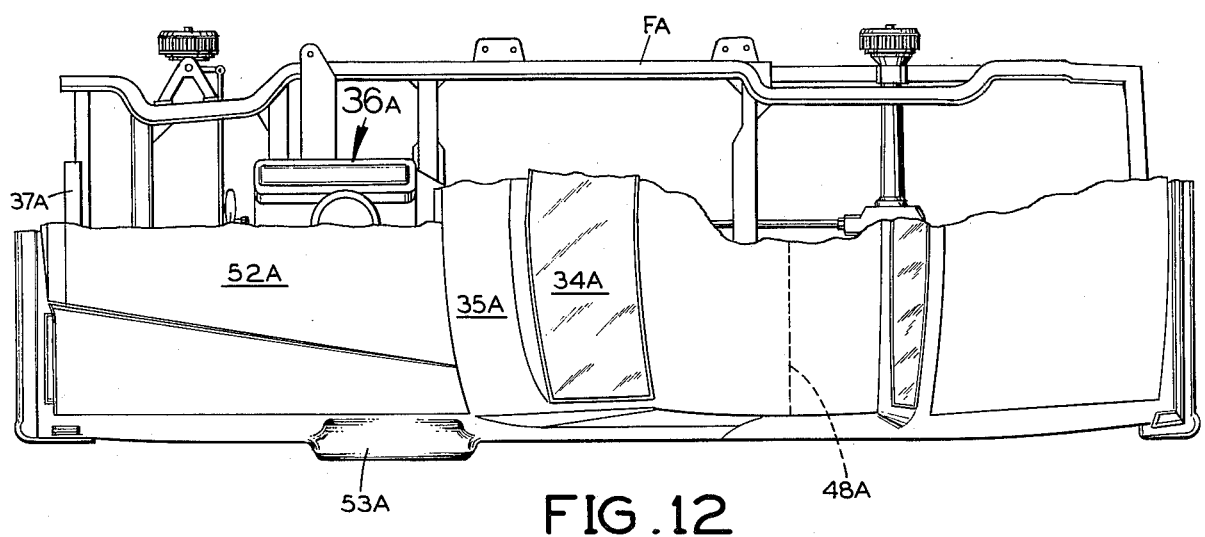
FIG. 12 is a top plan view of the FIG. 11 car with the body removed for clarity along one side.

Referring to FIGS. 11 and 12, corresponding elements of the rear wheel drive car, as modified by the present method, are given the same reference numerals as the elements of the front wheel drive car in FIGS. 1-10, with with an "a" suffix added.

The steps of modifying the front wheel drive car are the same as those described with reference to FIGS. 1-10 for modifying the front wheel drive car with these exceptions:

(1) the engine 36a is displaced rearwardly along the frame from its original position;

(2) the drive tunnel is shortened the same amount as the front section of the car body; and (3) a correspondingly shorter drive shaft running from the engine to the rear wheels is provided.

Preferably, the engine 36a remains in the same position with respect to the firewall, so that when the front section of the car body is moved back along the frame, the engine is moved back in unison with it and the steering wheel 39a and steering shaft 40a.

Before such rearward displacement is done, the drive shaft running from the engine to the rear wheels is removed from the drive tunnel and the drive tunnel is severed along transverse cut lines 22 inches apart, in the same manner as in my aforementioned U.S. Pat. No. 4,099,313. When the severed front section of the car body is displaced rearward into abutting juxtaposition with the rear section of the car body at the roof, the severed front section of the drive tunnel also is brought into abutting juxtaposition with its rear section, at which time they are welded to each other to form a modified unitary drive tunnel which is shorter by 22 inches than the original drive tunnel. The original drive shaft is replaced in the drive tunnel by a correspondingly shorter drive shaft. This may be done by removing a 22 inch length from the original drive shaft and then welding the severed front and rear sections to each other, or by substituting an entirely new, shorter drive shaft in place of the original one. The shorter drive shaft is inserted in the drive tunnel before the front and rear sections of the drive tunnel are welded together. After this has been done, the floor plate is welded in place to cover the gap in the floor.

The radiator 37a remains in its original position on the front end of the frame Fa. A tubular air guide or tunnel 60 is inserted between the radiator and the engine fan 61 to guide cooling air to the latter, as in my U.S. Pat. No. 4,099,313.

Figure 13:
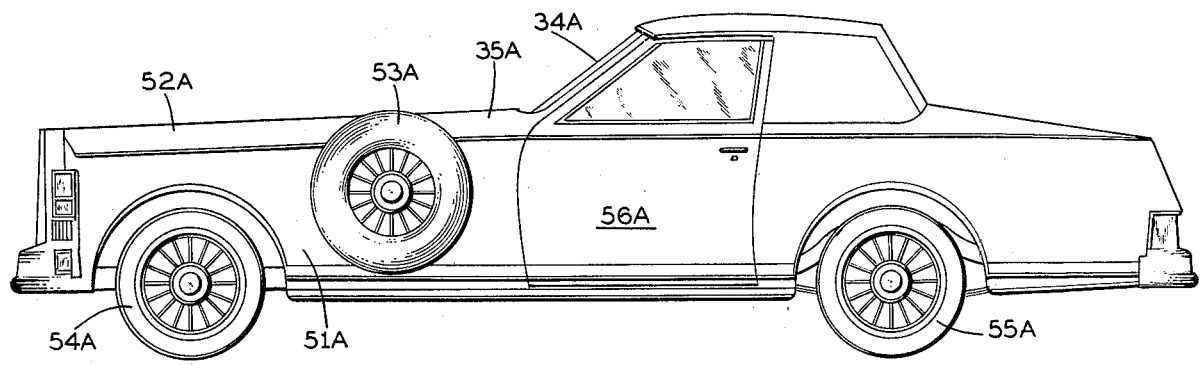
FIG. 13 is a view similar to FIG. 10 and showing a finished rear wheel drive car which has been modified in accordance with the present method.

The finished car having the modified car body has the appearance shown in FIG. 13.

In both embodiments of the present method, structural reinforcements may be provided for the longer engine compartment hood and front fenders.

I claim:

1. A method of converting a passenger car, which has a four-door body bolted to the frame, to provide a shortened body at the back and a lengthened engine compartment at the front without structurally modifying the frame, which method comprises the steps of:

removing, by cutting the body without cutting the frame, a longitudinal segment of the roof and a longitudinal section of the floor of the car body immediately behind the door posts to sever the car body into front and rear sections;

disconnecting the steering shaft from the steering gear for the front wheels;

with the front fenders and the engine compartment hood removed, unbolting the front section of the car body from the frame and displacing said front section of the car body and the steering shaft as a unit rearwardly away from the front wheels along the frame to bring the severed front and rear sections of the roof into aligned, abutting juxtaposition;

bolting the front section of the car body to the frame in its rearwardly displaced position along the frame, and joining said front and rear sections of the car body to each other at the roof and floor to provide a converted unitary car body which has been shortened immediately behind the door posts;

operatively coupling an extension shaft between the steering shaft and the steering gear for the front wheels;

and attaching to the car body an engine compartment hood and front fenders which are longer than the original hood and fenders by an amount substantially equal to the length of the segment removed from the roof.

2. A method according to claim 1, wherein the car has a front wheel drive, and the engine is maintained in its original position on the frame.

3. A method according to claim 1, wherein the car has a rear wheel drive including a drive shaft extending through a drive shaft tunnel along the bottom of the car, and further comprising the steps of:

removing the drive shaft from said tunnel and removing a longitudinal segment of said tunnel before displacing the front section of the car body rearwardly along the frame;

displacing the engine rearwardly along the frame in unison with the rearward displacement of the front section of the car body;

joining the severed front and rear sections of the drive shaft tunnel to provide a unitary, shortened tunnel after the front section of the car body is displaced rearwardly along the frame;

and putting a correspondingly shorter drive shaft in the shortened drive shaft tunnel.

4. A method according to claim 1, wherein the front and rear doors and seats, the front fenders and the engine compartment hood are removed from the car body before it is severed at the roof and floor.

5. A method according to claim 4, and further comprising the steps of closing the openings in the opposite sides of the car body immediately behind the door posts after the front and rear sections of the roof and floor are joined.

* * * * *